US006748069B1

(12) United States Patent
Nimmagadda et al.

(10) Patent No.: US 6,748,069 B1
(45) Date of Patent: Jun. 8, 2004

(54) METHOD AND SYSTEM FOR ROUTING CALLING NAME QUERIES

(75) Inventors: Prasad Nimmagadda, Norcross; Anita H. Simpson, Decatur, both of GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 08/934,492

(22) Filed: Sep. 19, 1997

(51) Int. Cl.[7] ................................................. H04M 3/42
(52) U.S. Cl. ............................ 379/201.07; 379/127.01; 379/142.06
(58) Field of Search ....................... 379/207.15, 217.01, 379/221.02, 93.23, 142.06, 120, 127.01, 354, 201.01, 211.01, 219–220.01, 229, 265, 242–243, 201.07; 455/566–567, 550, 575

(56) References Cited

U.S. PATENT DOCUMENTS

| | | | | |
|---|---|---|---|---|
| 5,502,759 A | * | 3/1996 | Cheng et al. .................. | 379/88 |
| 5,566,235 A | | 10/1996 | Hetz ........................... | 379/201 |
| 5,625,681 A | * | 4/1997 | Butler, II ..................... | 379/207 |
| 5,661,792 A | * | 8/1997 | Akinpelu et al. ............ | 379/221 |
| 5,771,283 A | * | 6/1998 | Chang et al. ................ | 379/142 |
| 5,854,836 A | * | 12/1998 | Nimmagadda ............... | 379/207 |
| 5,892,821 A | * | 4/1999 | Turner ......................... | 379/220 |
| 5,903,636 A | * | 5/1999 | Malik | |
| 5,949,865 A | * | 9/1999 | Fusinato | |
| 5,949,867 A | * | 9/1999 | Sonnenberg ................. | 379/211 |
| 5,949,870 A | * | 9/1999 | Hayduk et al. | |
| 6,028,921 A | | 2/2000 | Malik et al. | |

OTHER PUBLICATIONS

"LATA Switching Systems Generic Requirements; Class Feature: Calling Delivery Generic Requirements," Technical Refrence TR–NWT–001188, published Dec., 1991 by Bell Communications Research.

International Search Report of PCT/US98/18367 mailed Mar. 16, 1999 by European Searching Authority of the PCT.

Powers, R., et al. "Calling Name Delivery," *Annual Review of Communications*, vol. 46, Jan. 1, 1992 pp–633–635.

Chen, J.C., "Open AIN Operations Strategies," Proceedings of the Network Operations and Management Symposium, (NOM, Kissimmee, Feb. 14–17, 1994, vol. 1, No. SYMP. 4, Feb. 14, 1994, pp. 140–152.

"T1.112–Issue 4 (WD)", Bell Communications Research.

"6.4.2.27 Location Request" WIN TIA/EIA–41.5–5 Modifications, Bell Communications Research.

"3.2.1 Scenario Diagram Conventions" WIN TIA/EIA–41.1–D Modifications, Jan. 19, 1999, Bell Communications Research.

BellSouth Telecommunications, AIN IBU — Network, (Mar. 1994). *A Technical Overview of BellSouth Telecommunications' Advanced Intelligent Network.*

(List continued on next page.)

Primary Examiner—Duc Nguyen
(74) Attorney, Agent, or Firm—Nora M. Tocups, Esq.

(57) ABSTRACT

A method and system for routing Calling Name queries in a locally competitive environment includes the creation of a Calling Name query having both the calling party number and the called party number. The query is routed to a service control point of the local exchange carrier, where the called party number is extracted to determine the Calling Name service provider for the called party. The service control point accesses a series of databases to route the Calling Name query to the proper service provider/destination. The databases include a database storing a table of subscribers and their choice for Calling Name service, a database storing porting status of telephone numbers, and a database storing information about distribution of other local number portability databases.

24 Claims, 8 Drawing Sheets

OTHER PUBLICATIONS

Alcatel IN Division, (Aug. 12, 1998). *Data Sheet: Calling Name Presentation and Restriction, Revision 0.1.*

Alcatel USA Inc. (Dec. 8, 1998). *Calling Name Delivery (CNAM), Revision 0.2.*

Compaq (Mar. 9, 1999). *Calling Name Presentation (CNAP) Application: Feature Description, Version 1.1.*

Powers, R., et al., "Calling Name Delivery," *Annual Review of Communications*, vol. 46, Jan. 1, 1992 pp.–633–635.

Chen, J.C., "Open AIN Operations Strategies," *Proceedings of the Network Operations and Management Symposium*, (NOM, Kissimmee, Feb. 14–17, 1994, vol. 1, No. SYMP. 4, Feb. 14, 1994, pp. 140–152.

"LSSGR, LATA Switching Systems Generic Requirements," Bellcore Bell Communications Research, Technical Reference TR–NWT–001199, Issue Dec. 1, 1999, pp. 61–73.

\* cited by examiner

| |
|---|
| PACKAGE TYPE IDENTIFIER |
| TOTAL TCAP MESSAGE LENGTH |
| TRANSACTION ID IDENTIFIER |
| TRANSACTION ID LENGTH |
| ORIGINATING TRANSACTION ID |
| COMPONENT SEQUENCE IDENTIFIER |
| COMPONENT SEQUENCE LENGTH |
| COMPONENT TYPE IDENTIFIER |
| COMPONENT LENGTH |
| COMPONENT ID IDENTIFIER |
| COMPONENT ID LENGTH |
| COMPONENT ID |
| OPERATION CODE IDENTIFIER |
| OPERATION CODE LENGTH |
| OPERATION FAMILY |
| OPERATION SPECIFIER |
| PARAMETER SET IDENTIFIER |
| PARAMETER SET LENGTH |
| GENERIC NAME IDENTIFIER |
| SERVICE KEY IDENTIFIER |
| SERVICE KEY LENGTH |
| DIGITS IDENTIFIER |
| DIGITS LENGTH |
| DIGITS (CALLING DIRECTORY NUMBER) |
| DIGITS IDENTIFIER |
| DIGITS LENGTH |
| DIGITS (CALLED NUMBER) |
| ACG ENCOUNTERED IDENTIFIER% |
| ACG ENCOUNTERED LENGTH% |
| ACG ENCOUNTERED% |

FIGURE 2

| 420 | 440 | 460 | 480 |
|---|---|---|---|
| 4045551111 | network1:cluster1: member1 | CLEC 1 | CNAM 1 |
| 4045552222 | network1: cluster2: member2 | CLEC 2 | CNAM 2 |
| 4045553333 | network1:cluster3: member3 | CLEC 3 | CNAM 3 |

FIGURE 4

METHOD AND SYSTEM FOR ROUTING CALLING NAME QUERIES

BACKGROUND OF THE INVENTION

1. Field of the Invention

The present invention is directed to routing queries within a telephone network and, more particularly, to methods and system for routing Calling Name Service queries to multiple service providers within a locally competitive environment.

2. Background

Calling Name Service is one of several popular telephone services offered by Incumbent Local Exchange Carriers ("ILECs") within a region. Calling Name allows a subscribing called party to obtain information about a calling party prior to initiation of the conversation. Information that can be obtained include the calling party's name, phone number, and address. The ILEC usually transfers the information to a display attached to the called party's telephone. The called party may thus identify the calling party prior to answering the call. Calling Name may be used for a variety of purposes, such as avoiding telemarketers and other unwelcome solicitors. Called parties may also use Calling Name to avoid more serious forms of harassment and stalking.

Calling Name is currently offered within certain regions by the ILEC for that region. Under the current paradigm, a Calling Name transaction begins in the called party's End Office ("EO"), a programmable switch that receives calls for the subscribing called party. Upon receiving a call for a Calling Name subscriber, the EO launches a Calling Name query to obtain the calling party's information. The EO formats the query using a TR1188 protocol and containing the ten-digit calling party telephone number. The query is sent to a signal transfer point ("STP") to determine the proper Calling Name ("CNAM") database storing the necessary information. The STP uses a lookup table to route the query to the proper CNAM database based upon the calling party number. The query may be routed to either an in-region database or to an out-of-region database. The CNAM database accesses the information and returns a response directly to the requesting switch (the EO).

The current method for routing Calling Name queries is suitable for an environment lacking "unbundled" local competition. The advent of local competition, however, complicates the telecommunications scenario. Pursuant to the Telecommunications Act of 1996, the FCC has mandated certain "interconnection" requirements to make it easier for new companies to enter a local telecommunications market. The goal of the Act is to offer a wider selection of local service providers to consumers. The two FCC mandates that, perhaps, significantly impact the Calling Name Service are: (1) FCC First Report & Order in the matter of Telephone Number Portability, docket 95-116, released Jul. 2, 1996 (Local Number Portability); and (2) FCC Report & Order in the matter of Local Competition, docket 96-98 released Aug. 8, 1996 ("Unbundling").

Local number portability ("LNP") allows subscribers to keep their phone numbers when they change residences and/or service providers. A mandate of the Telecommunications Act of 1996, this option must be available to subscribers in the top 100 markets by the end of 1998. The advantages of retaining one's phone number were recognized in exchange tariffs as early as the 1960s. The issue also cropped up in the 1980s and early 1990s, when portability for 800 numbers was instituted to encourage competition in the toll-free long-distance sector. More recently, a survey conducted by the Gallup poll found that nearly 80 percent of residential subscribers and 90 percent of business subscribers would be unwilling to change service providers if they had to surrender current phone numbers.

"Unbundling" is a regulatory requirement providing competitive local exchange carriers ("CLECs") or other information providers the ability to separately lease discrete functional components of an ILEC's network to provide service. An unbundled local loop, for example, is an ILEC-provided transmission path between, and including, the customer network interface (e.g., the jack) located at the end-customer's premises and the central office loop termination located in the ILEC's central office building. As another example, an unbundled port provides a CLEC with local switching functionality, in addition to the local loop, on an ILEC's switch as an alternative to providing a standalone switch. Numerous components may be unbundled, including the local loop, switch ports, and Advanced Intelligent Network ("AIN") triggers.

Further, the CLECs may desire to offer competitive vertical services (e.g., Calling Name, Call Forwarding, Follow Me Services) as an alternative to those services provided by the ILEC. In particular, offering Calling Name service in an unbundled environment, however, poses additional problems. In the current Calling Name scenario, which accounts for a local number portability environment, when a called party has subscribed to Calling Name service, her end office will send a query to a signal transfer point ("STP"). The STP will determine the location of the Calling Name database based upon the NPA-NXX of the calling party number. The STP will then route the Calling Name query to the appropriate Calling Name database. The Calling Name database typically includes the name information and city/state information for a group of telephone numbers. Additionally, the SS7 Network can check to see if the calling party number belongs to a portable NPA-NXX and, if ported, can route the query to the appropriate Calling Name database.

However, in the current method, there is no identification information available that indicates the choice of Calling Name Service provider. For example, assume that a CLEC leasing unbundled ports wants Calling Name queries to be routed to its own or a representative Calling Name database. Today's Calling Name query only includes information about the calling party, not the called party. Accordingly, the SS7 Network can only route the query based on the calling party's telephone number. Thus, the CLEC cannot provide Calling Name service to its leased unbundled ports from service providers other than the ILEC.

SUMMARY OF THE INVENTION

The present invention overcomes the problems and disadvantages of the prior art by creating a Calling Name query that includes not only the calling party telephone information, but additional identifying information about characteristics of the called party. By including this additional called party information within the query, the local exchange carrier may then determine the appropriate Calling Name service provider for the called party. In addition, the present invention includes a cooperative mechanism for working with multiple databases (e.g., Calling Name, LNP) in a manner that seeks to minimize the number of additional processing steps in providing the Calling Name service.

The present invention further includes a mechanism for dealing with ported calling party telephone numbers. In particular, the present invention uses a service control point to access a local number portability database. The database includes a list of ported numbers. The service control point compares the calling party number contained in the query to the numbers stored in the database. If the calling party number is stored in the database, the service control point routes the query to the calling party's service provider. If the number is not ported, the service control point forwards the Calling Name query to an appropriate Calling Name database.

In a preferred embodiment of the present invention, a ported or unported calling party makes a telephone call to a called party on an unbundled port. The calling party's end office switches the call to the called party's end office. The called party's end office creates a Calling Name query containing information about the calling party's telephone number and information about characteristics of the called party. The called party's end office sends the query to a signal transfer point within the end office's service area. The signal transfer point routes the query to the service control point based upon an address received in the query.

The service control point includes: (1) a CNAM Service Provider Identification ("CSPI") database; (2) a local number portability ("LNP") database; (2) an out-of-region (OOR") data table; and information about the distribution of other LNP databases. Each service control point has a corresponding area of service, linking a group of NPA-NXXs to a particular service control point. The service control point is coupled to one or more Calling Name databases, each database having its own area of service. In the present invention, each service control point area of service includes one or more Calling Name areas of service, such that calling name queries may be routed directly to a Calling Name database. Thus, the need for the STP to determine the destination of a Calling Name query is eliminated. STPs may still be relied upon for routing the query to a destination.

The service control point determines the appropriate Calling Name service provider for the called party based upon information stored in the CSPI database. If the called party is not a subscriber to the ILEC's Calling Name service, the query is routed to the proper Calling Name service provider. If the ILEC is the Calling Name service provider, the service control point determines whether the calling party is within the ILEC's overall service region based upon the OOR data table. If the calling party is not within the region, the query is sent to a Calling Name database out of the region. If the calling party is within the region, the service control point determines whether the calling party is within its particular area of service. If the calling party is not within its area of service, the service control point then routes the query to another service control point in a separate area of service.

If the calling party telephone number is within its area of service, the service control point determines whether the calling party telephone number is ported. Queries having ported calling party numbers are routed to the appropriate service provider for obtaining the calling party name information. For queries having non-ported calling party numbers, the service control point routes the query directly to a local Calling Name database within its area of service for obtaining the Calling Name information respecting the calling party. The Calling Name information is routed back to the called party's end office.

As discussed above, the present invention couples a service control point area of service with a Calling Name database area of service. An area of service includes a range of telephone numbers. Each local number portability service control point area of service may include one or more Calling Name database areas of service. But each Calling Name database area of service may be coupled to only one service control point area of service. This coupling of areas of service reduces the number of hops back and forth between Calling Name databases to obtain information. Moreover, this coupling ensures that undercoverage and/or overcoverage of Calling Name information will not occur.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 2 is an illustration of a TR1188 query, including a called party number, in accordance with a preferred embodiment of the present invention.

FIG. 4 is an illustration of the Called Party Number-to-CNAM Service Provider table, in accordance with a preferred embodiment of the present invention.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
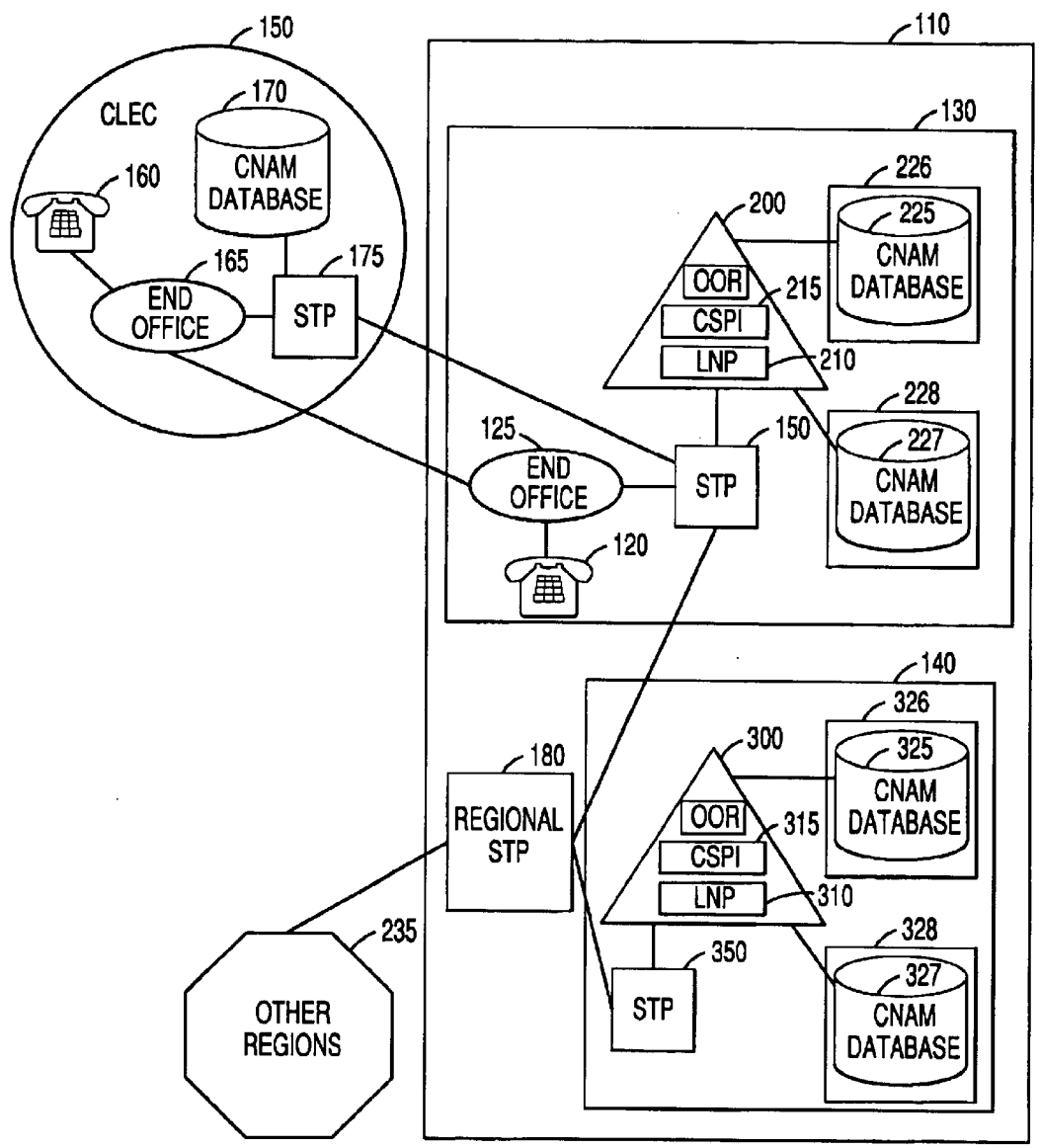
FIG. 1 is a block diagram of a locally competitive telephone network in accordance with a preferred embodiment of the present invention.

FIG. 1 is a block diagram of an exemplary group of telephone networks interconnected via Signaling System #7 ("SS7") and operating in a locally competitive environment, in accordance with a preferred embodiment of the present invention. More specifically, the network includes a region 110 serviced by an incumbent local exchange carrier ("ILEC") and one or more regions 150 serviced by a competitive local exchange carrier ("CLEC"). The CLEC region 150 and ILEC region 110 may overlap. The ILEC calling region 110 is further broken down into two Calling Name Routing/Local Number Portability Service Control Point ("CNAM Routing/LNP SCP") areas of service 130,

140. Each CNAM Routing/LNP SCP area of service 130, 140 provides Calling Name Routing service for a particular group of NPA-NXXs.

The CLEC region 150 includes a calling party 160 and a CLEC end office 165 that switches calls to and from the calling party 160. The CLEC region 150 further includes a signal transfer point ("STP") 175 for routing messages to and from other networks, such as network 110. The STP 175 may also route messages to its own internal SS7 nodes, including a Calling Name ("CNAM") database 170 that stores Calling Name information, such as a calling party's name and telephone number. Although a CLEC is illustrated, it should be apparent that the principles described herein equally apply to other information providers.

The CNAM Routing/LNP SCP area of service 130 further includes a called party 120 who is connected to a switch located in an ILEC-provided end office 125. The called party 120 has a choice of subscribing to a Calling Name service provided by either the ILEC or a CLEC (or other information provider). In addition, the called party's port may have been previously unbundled by the ILEC. Accordingly, a CLEC or other information provider may be leasing the called party's port and providing local as well as Calling Name service to the called party 120.

When the calling party 160 initiates a telephone call to the called party 120, the calling party's end office 165 switches the call to the called party's end office 125. The calling party telephone number (in NPA-NXX-XXXX format) is automatically transmitted to the end office 125. Because the called party 120 is a Calling Name subscriber, the called party's end office 125 has been programmed to initiate a Calling Name query prior to connecting the call. Accordingly, the called party's end office 125 launches a Calling Name query, such as a TR1188 TCAP query message, to an STP 150 for routing to a CNAM database. The TR1188 standards are described in detail in "LATA Switching Systems Generic Requirements; Class Feature: Calling Name Delivery Generic Requirements," Technical Reference TR-NWT-001188, published December, 1991 by Bell Communications Research, (the "TR1188 specification") which is incorporated by reference herein.

FIG. 2 is an illustration of a TR1188 TCAP Residence Name query 250, including additional fields to capture the called party number. The query 250 is formatted according to the SS7 TCAP requirements, as described in the TR1188 Specification. As shown, the TCAP query 250 includes several fields of 1 to 9 octets, including a 1-octet length Digits Identifier field 256 coded to indicate that the field 258 to follow contains a calling party number, a 1-octet length digits length field 257 to indicate that the length of the digits field 258 is 9 octets, and a 9-octet length Digits [Calling Directory Number] field 258 indicating the NPA-NXX-XXXX of the calling directory number. This number is usually the area code and telephone number of the calling party 160. Together, the fields create a calling party number field 255. In addition to the fields normally found in the query 250, the present invention introduces three additional fields: a 1-octet length Digits Identifier field 261 to indicate that the field 263 to follow is a called party number, a 1-octet length digits length field to indicate that the length of the digits field 263 is 9-octets, and a 9-octet length Digits [Called Number] field 263 indicating the NPA-NXX-XXXX of the called directory number. Together, the fields create a called party number field 260. The Called Number field 260 will be used by the CNAM Routing/LNP SCP to determine the proper Calling Name service provider. Although the inclusion of a called party telephone number 260 is illustrated, the query 250, instead, may include other information about characteristics of the called party. For instance, the query may include the name of the called party's service provider.

Figure 3:
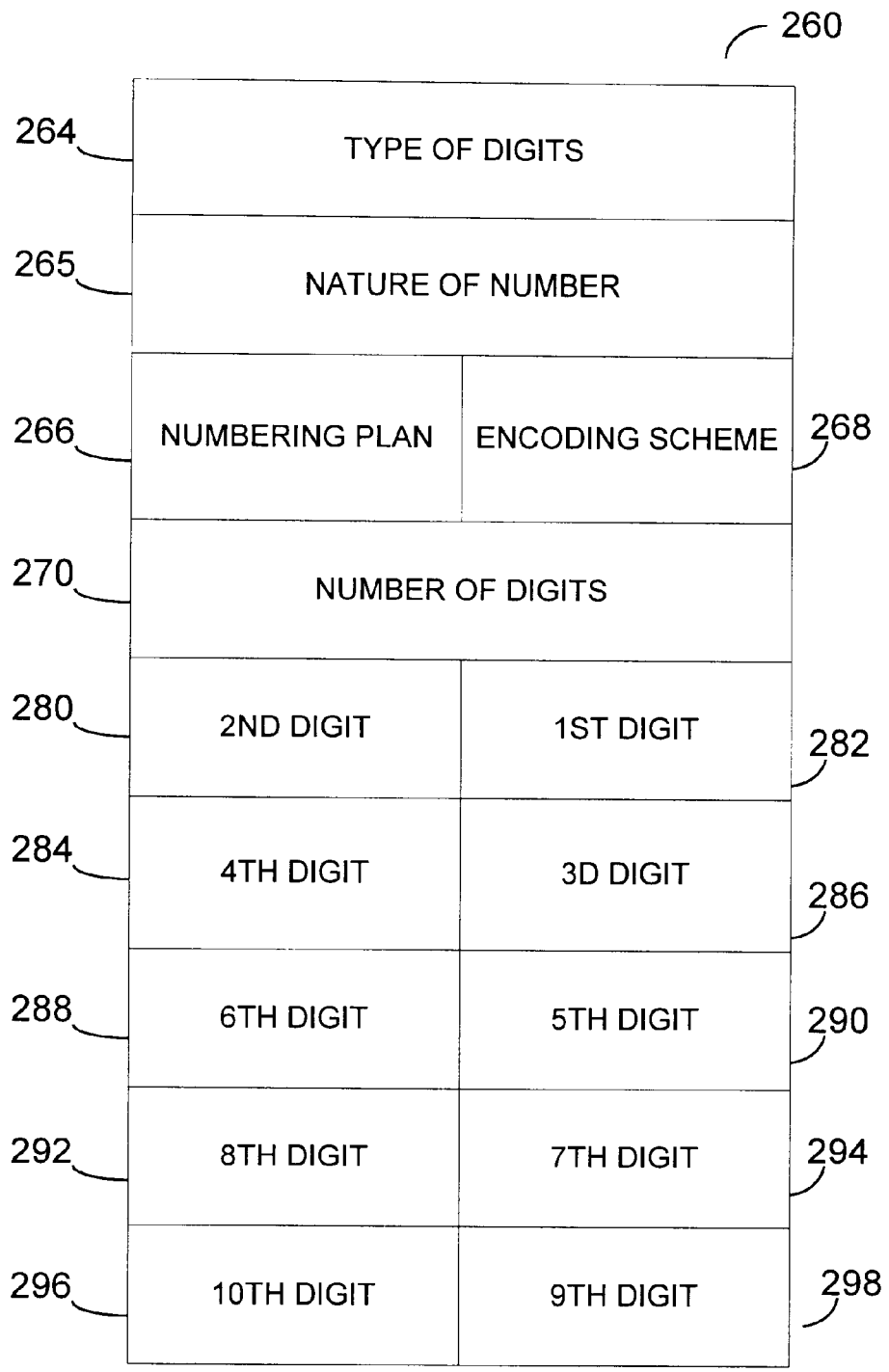
FIG. 3 is a block diagram of the Digits [Called Number] field of the query, in accordance with a preferred embodiment of the present invention.

FIG. 3 is a block diagram illustrating the structure of the 9-octet length Digits [Called Number] field 263 of the calling name query 250. The Digits [Called Number] field 263 allows a ten-digit called party number to be sent in the query 250. The field 263 has a format similar to the Digits [Calling Directory Number] field 258. Thus, the field 263 is coded contextual, primitive, with identifier code 4 in national standard TCAP. The Type of Digits subfield 264 is coded to specify that the subfield is a Called Directory Number. The Nature of Number subfield 265 has Bit 1 coding of "0" to indicate a "national number" and Bit 2 coding of "0" if presentation is allowed. Bit 2 is coded "1" if presentation is restricted. Bits 3–8 of the Nature of Number subfield 264 are spare bits and are coded zeros. The Numbering Plan subfield 266 is coded 0001 to indicate the ISDN Numbering Plan. The Encoding Scheme subfield 268 is coded 0001 to indicate BCD encoding. The Number of Digits subfield 270 is binary coded to indicate the number of digits present in the Digits subfield 272. Since 10 digits will be sent (NPA-NXX-XXXX), this field 270 is coded 00001010. The ten BCD-encoded digits of the Called Party Number are then sent in subfields 280–298.

The EO 125 transmits the query 250, including the called party telephone number 263 or other called party identifying information, to the STP 150. The STP 150 is responsible for routing traffic within the area of service 130. The STP 150 is not the originator of any traffic and is never the final recipient of any traffic. It is an intermediate point which provides limited processing and routing of messages. The STP 150 includes stored data to determine the appropriate CNAM Routing/LNP SCP for handling the query 250 and routes to the location accordingly. In the network illustrated, the STP 150 routes the Calling Name query to a CNAM Routing/LNP SCP 200 (described below) within the STP's area of service 130. In a preferred embodiment, the STP 150 routes all Calling Name queries to a CNAM Routing/LNP SCP rather than performing its present function of selectively routing CNAM queries to portable NPA-NXXs.

The CNAM Routing/LNP SCP 200 is a front end to a Local Number Portability database 210, a CNAM Service Provider Information ("CSPI") database 215, and an out-of-region ("OOR") data table 212. The CNAM Routing/LNP SCP 200 is further coupled to one or more Calling Name databases 225, 227 within the network 100. The CNAM Routing/LNP SCP 200 includes processing logic for both processing and routing messages. Although the CNAM Routing/LNP SCP 200 is not a database itself, it may be collocated with databases 210, 215, 225, 227.

Each CNAM database area of service 226, 228 corresponds to a particular group of telephone numbers. For instance, CNAM database area of service 226 may include telephone numbers in an NPA-NXX range of 404–100 through 404–599, while CNAM database area of service 228 may include telephone numbers in an NPA-NXX range from 404–600 through 404–999. In a preferred embodiment of the present invention, each CNAM Routing/LNP SCP 200 may be coupled to one or more CNAM databases 225, 227. The CNAM Routing/LNP SCP area of service 130 is constructed by grouping an integral number of CNAM database areas of service 226, 228. In other words, the CNAM Routing/LNP SCP area of service may include more than one CNAM database area of service. But each CNAM database area of service may be included in only one CNAM Routing/LNP SCP area of service. Absent such coupling of CNAM Routing/LNP SCP areas of service and CNAM database areas of service, overcoverage or undercoverage of Calling Name information would result.

Upon receiving the query 250 from the STP 150, the CNAM Routing/LNP SCP 200 extracts the called party number field 260 from the query 250. The CNAM Routing/LNP SCP 200 uses the extracted called party number to access the CSPI database 210. The CSPI database 210 includes a Called Party Number-to-CNAM Service Provider table 400, as illustrated in FIG. 4. The CNAM Routing/LNP SCP 200 uses the table 400 to determine the Calling Name Service Provider for the called party 120.

The table 400 includes a called party field 420 and a routing point code field 440. The values shown in the fields 420, 440, as illustrated in FIG. 4, are for example purposes only. The called party field 420 contains a ten-digit telephone number for subscribers to alternate (non-ILEC-provided) Calling Name service providers. The routing point code field 440 includes an SS7 point code address corresponding to the Calling Name service provider of the party indicated in the adjacent called party field 420. For example, in FIG. 4, a called party with the telephone number "404-555-1111" subscribes to a Calling Name service provider having the SS7 point code "network1:cluster1:member1". Similarly, a called party with the telephone number "404-555-2222" subscribes to a Calling Name Service Provider having a point code "network1:cluster2:member2". The table 400 may include additional information, such as an identifier 460 for the calling party's CLEC and an identifier 480 for the Calling Name service provider. In a preferred embodiment of the present invention, the table 400 includes only those ten-digit telephone numbers for which the ILEC is not the Calling Name service provider. It should be apparent, however, to one of ordinary skill in the art that the table 400 may be configured, for example, to include all ten-digit telephone numbers receiving Calling Name service.

If the number of the called party 120 is listed in the table 400, the database 210 retrieves the appropriate Calling Name service provider point code address and provides the Calling Name service provider point code address to the CNAM Routing/LNP SCP 200. The CNAM Routing/LNP SCP 200 will "hand off" the query 250 to the called party's Calling Name Service Provider. Specifically, the CNAM Routing/LNP SCP 200 sends the query 250 and the point code address to the STP 150. The STP 150 will then route the query 250 to the specified address of the Calling Name service provider.

If the number of the called party 120 is not found in the table 400, the CNAM Routing/LNP SCP 200 assumes that the called party 120 is a subscriber to the ILEC's Calling Name service. The CNAM Routing/LNP SCP 200 then determines whether the calling party 160 is within the ILEC's coverage region 110 by examining the OOR data table 212. The CNAM Routing/LNP SCP 200 extracts the calling party number 255 from the query 250 to determine the NPA-NXX of the calling party 160. If the NPA-NXX is outside of the ILEC's coverage region 110, the CNAM Routing/LNP SCP 200 routes the query to an OOR LEC to access the Calling Name information. The OOR LEC must previously have agreed to provide Calling Name information to the ILEC's Calling Name subscribers. If the parties have agreed as such, the CNAM Routing/LNP SCP 200 routes the query 250 back to the STP 150 with a point code address for the LEC's Calling Name database. Since the address is outside the STP's region, the STP 150 must route the query through a Regional Signal Transfer Point ("RSTP") 180. The RSTP then routes the query to the proper regional Calling Name database (not shown). The regional Calling Name database will return the Calling Name information to the end office 125.

Once the CNAM Routing/LNP SCP 200 determines that the calling party telephone number is located within its coverage region 110, the CNAM Routing/LNP SCP 200 must then determine whether the number is within its particular area of service 130. The CNAM Routing/LNP SCP 200 routes in-region, non-area-of-service queries to the appropriate CNAM Routing/LNP SCP for Calling Name processing. For example, in FIG. 1, if the CNAM Routing/LNP SCP 200 receives a query containing an in-region, out-of-service-area calling party number, the CNAM Routing/LNP SCP 200 sends the query and a point code for the proper CNAM Routing/LNP SCP 300 to the STP 150. The STP 150 sends the query to the RSTP 180 that routes the query to an STP 350 within the proper area of service 140. The STP 350 routes the call directly to the CNAM Routing/LNP SCP 300. The CNAM Routing/LNP SCP 300 performs all of the functions described above with respect to the CNAM Routing/LNP SCP 200. Thus, the CNAM Routing/LNP SCP 300 extracts the Digits [Called Party] field 260 from the query 250. The CNAM Routing/LNP SCP 300 sends the called party number to a CSPI database 315 to determine the Calling Name Service Provider for the called party 120. The CNAM Routing/LNP SCP 300 determines that the called party 120 is an ILEC Calling Name subscriber and that the calling party 120 is within its region 110 and its area of service 140. The CNAM Routing/LNP SCP 300 then determines portability of the calling party number, as described below.

If the calling party number is within the area of service 130 of the CNAM Routing/LNP SCP 200 (or, if routed to the CNAM Routing/LNP SCP 300, within the area of service 140), the CNAM Routing/LNP SCP 200 determines whether the calling party number is a ported number. In particular, the CNAM Routing/LNP SCP 200 uses the calling party number to access the LNP database 210. The database 210 contains a list of telephone numbers that have been ported between LECs. If the calling party number is listed, the new Calling Name information for the calling party 160 is contained in the Calling Name database of the calling party's LEC. If the LEC and the ILEC have an agreement regarding access to the LEC's database, the CNAM Routing/LNP SCP 200 may route the call to the LEC. In FIG. 1, for example, the CNAM Routing/LNP SCP 200 may determine that the calling party number is ported. Accordingly, the CNAM Routing/LNP SCP 200 would route the query back to the STP 150 along with a point code for the Calling Name database 170 (or, an SCP coupled to the database 170). The STP 150 would then route the query 250 to an STP 175. The STP 175 sends the query 250 to the CNAM database 170 for Calling Name lookup. The CLEC would have its own mechanism for accessing CNAM information from the CNAM database 170. The CLEC would return the CNAM information to the called party's end office 125. If no agreement is in place between the ILEC and the CLEC, the ILEC would access its own CNAM databases 225, 227.

For non-ported calling parties, the CNAM Routing/LNP SCP 200 routes the CNAM queries directly to its coupled CNAM databases 225, 227. Each database contains Calling Name information for a group of calling party numbers. The CNAM Routing/LNP SCP 200 obtains the Calling Name information and routes the information back to the end office 125 for the called party 120 through the router STP 150. The Calling Name information is shown on a Calling Name display coupled to the telephone of the called party 120.

Figure 5:
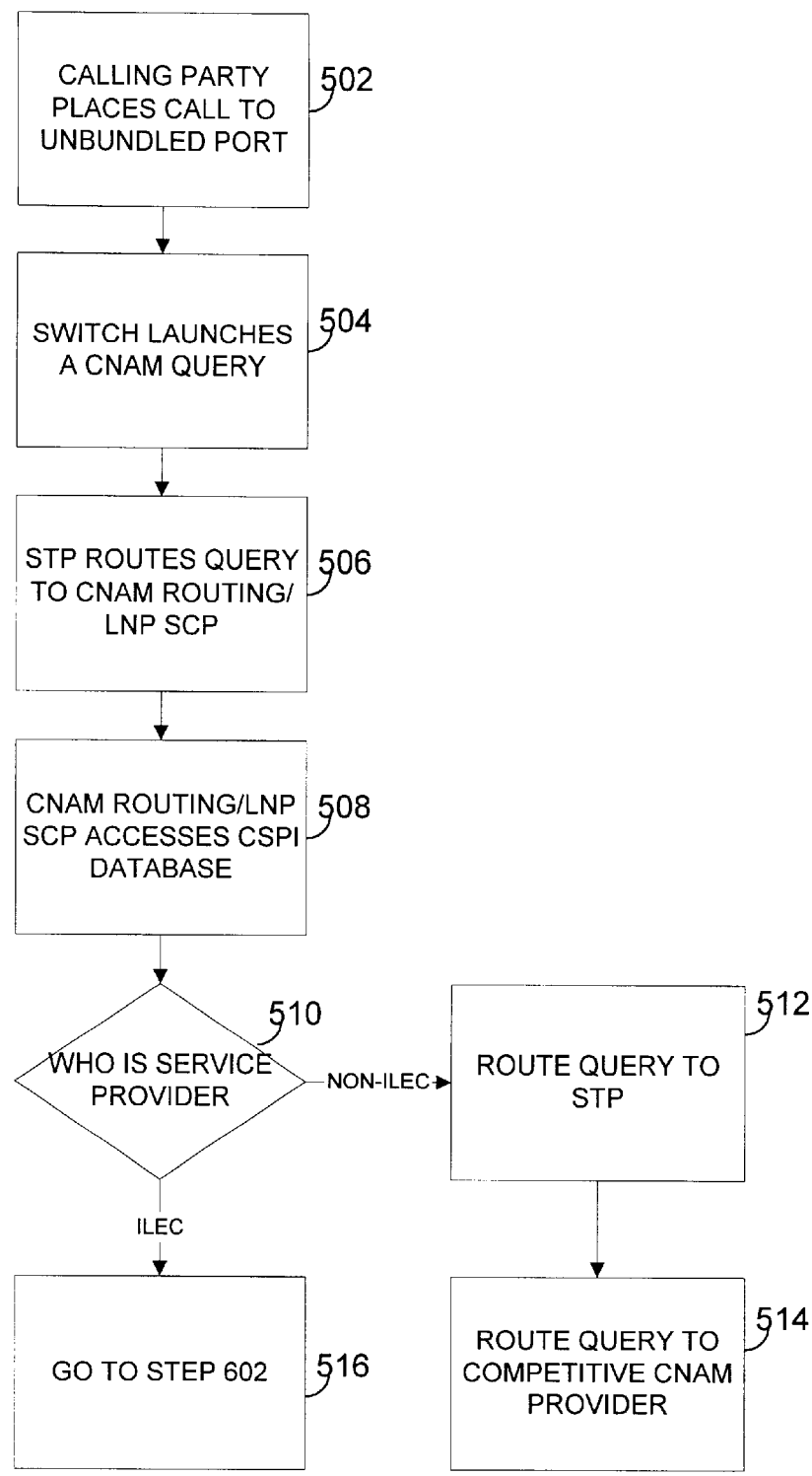
FIG. 5 is a flow chart illustrating the flow of information during a call to an unbundled port using a competitive CNAM provider, in accordance with a preferred embodiment of the present invention.

FIG. 5 is a flow chart illustrating steps performed during a call to an unbundled port using a competitive Calling Name provider. In step 502, the calling party 160 places a call to an unbundled port on the ILEC switch in the end office 125. The switch, in step 504, launches a CNAM TCAP query to the STP 150. In step 506, the STP 150 routes the query to the CNAM Routing/LNP SCP 200 within its area of service 130. The CNAM Routing/LNP SCP extracts the called party field 255 from the query 250 and accesses the CSPI database 215 in step 508. In step 510, the CNAM Routing/LNP SCP determines the Calling Name service provider of the called party. If the Calling Name service provider is not the ILEC, the CNAM Routing/LNP SCP, in step 512, routes the query to the STP 150 with the address for the alternate Calling Name provider. The STP 150 then routes the query to the Calling Name provider. If the called party 120 is a subscriber to the ILEC's Calling Name service, flow control continues at step 602 in FIG. 6.

Figure 6:
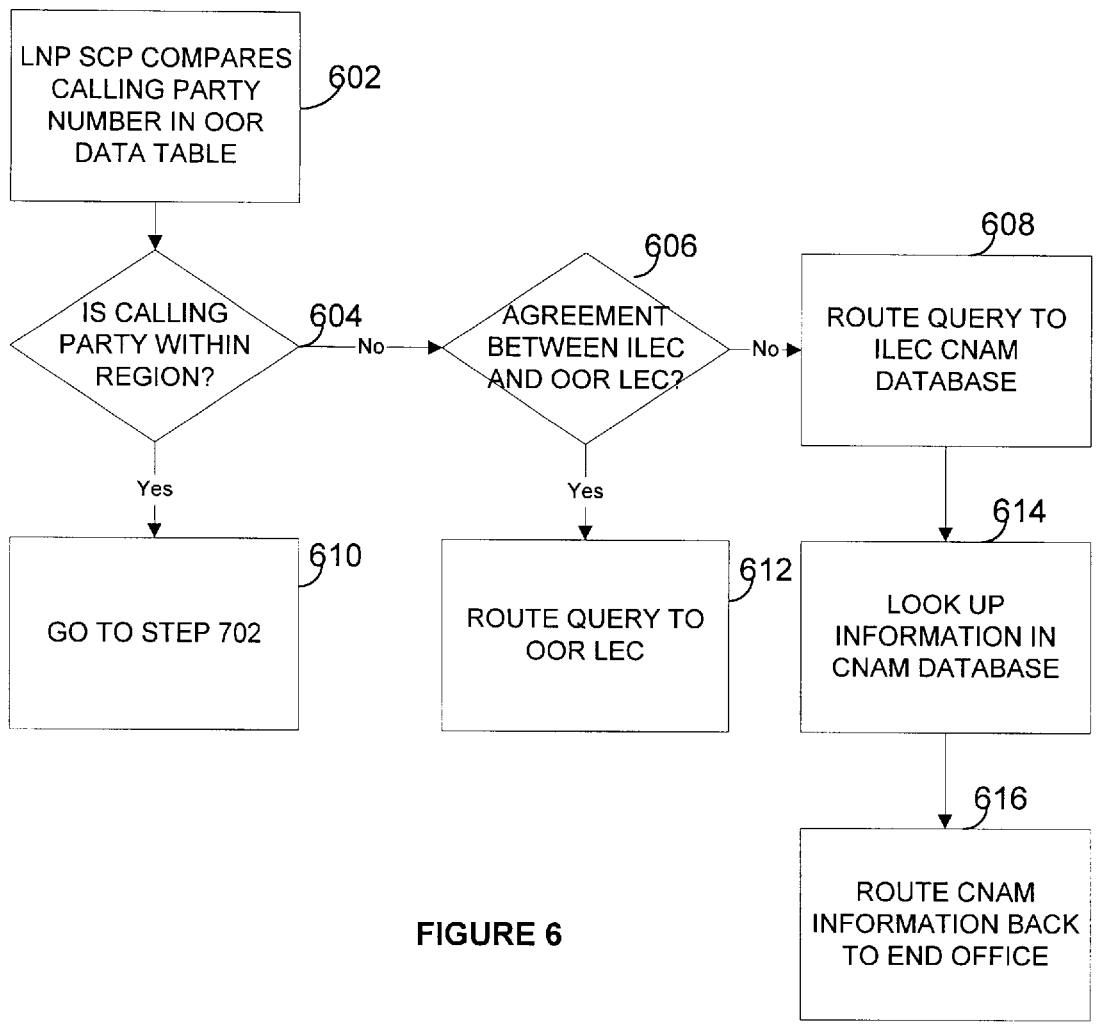
FIG. 6 is a flow chart illustrating steps performed during a call from an out-of-region calling party to an unbundled port, in accordance with a preferred embodiment of the present invention.
Figure 7:
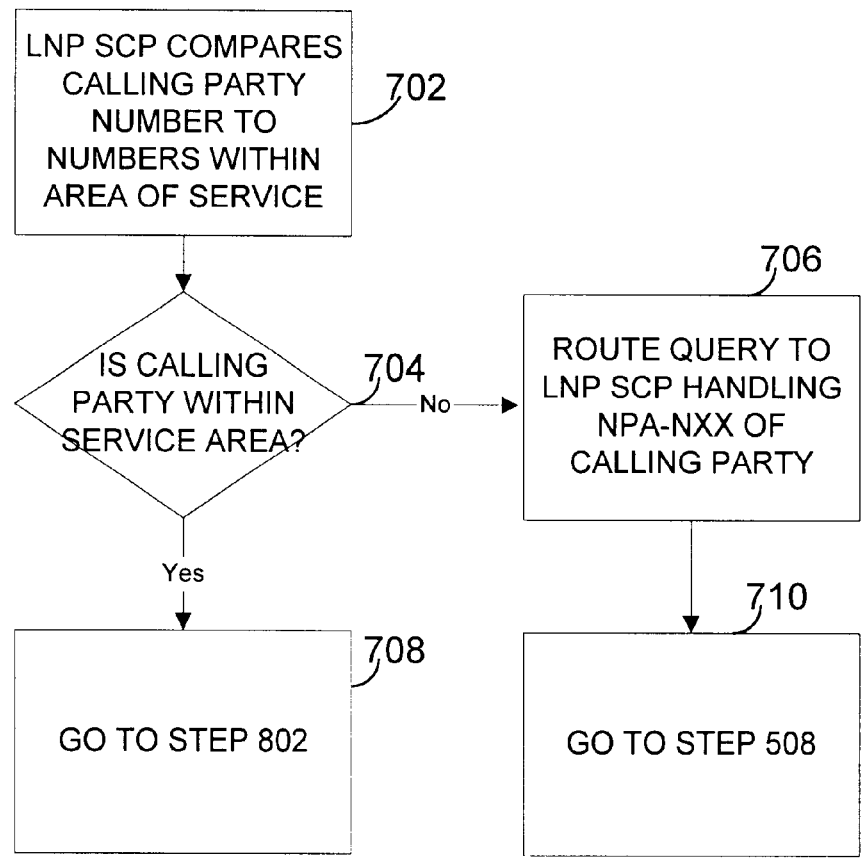
FIG. 7 is a flow chart illustrating steps performed during a call from an in-region, but out-of-service-area calling party to an unbundled port, in accordance with a preferred embodiment of the present invention.

In step 602 of FIG. 6, the CNAM Routing/LNP SCP 200 compares the calling party number to numbers outside the region contained in OOR data table 212. In step 604, the CNAM Routing/LNP SCP examines the result of comparing the calling party number to the OOR data table 212. If the number is outside the region, the CNAM Routing/LNP SCP 200 routes either to an out-of-region LEC (if an agreement exists between the ILEC and the out-of-region LEC) or to its own CNAM database (if no agreement exists) for Calling Name access in step 612. When information is routed to its own CNAM database, CNAM information, such as name/city/state information is retrieved in step 612 and routed back to the end office in step 614. If the calling party 160 is within the ILEC's coverage region, flow control continues at step 702 of FIG. 7.

Figure 8:
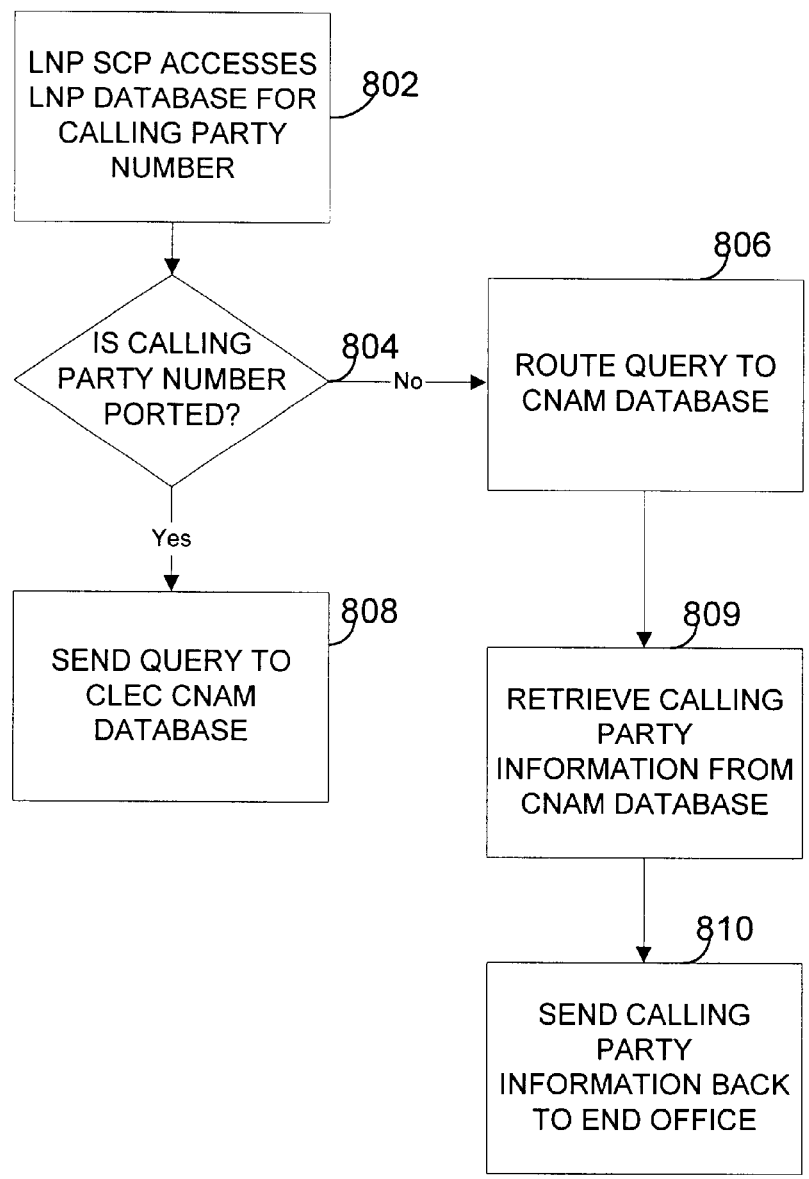
FIG. 8 is a flow chart illustrating steps performed during a call from a ported calling party to an unbundled port, in accordance with a preferred embodiment of the present invention.

In step 702, the CNAM Routing/LNP SCP 200 compares the calling party number to numbers within its area of service. In step 704, the CNAM Routing/LNP SCP 200 examines the result of the comparison. Accordingly, in step 706, the CNAM Routing/LNP SCP 200 routes the query 250 to another CNAM Routing/LNP SCP that corresponds to the area of service of the calling party. The new CNAM Routing/LNP SCP 300 performs the same processes as the first CNAM Routing/LNP SCP 200. Accordingly, the new CNAM Routing/LNP SCP begins program control flow at step 508 in FIG. 5. If the calling party 160 is within the area of service 130 of the first CNAM Routing/LNP SCP 200, control flow continues at step 802 of FIG. 8.

In step 802, the CNAM Routing/LNP SCP 200 provides the LNP database 210 with the calling party number to determine whether the calling party number has been ported. If the calling party number is ported, the CNAM Routing/LNP SCP 200 sends the query 250 to the CNAM database of the calling party's LEC. If the calling party number is not ported, the CNAM Routing/LNP SCP 200, in step 806, routes the query directly to an associated coupled CNAM database 225 or 227 for the Calling Name information. In step 809, the information is retrieved from the appropriate CNAM database. In step 810, the Calling Name information is routed back to the end office 125.

Having thus described a preferred embodiment of a method and system for routing Calling Name queries, it should be apparent to those skilled in the art that certain advantages have been achieved. It should also be appreciated that various modifications, adaptations, and alternative embodiments thereof, including its use in cellular telephone networks, for example, may be made within the scope and spirit of the present invention. The invention is further defined by the following claims:

What is claimed is:

1. A method for routing a TR-1188 Calling Name query to provide Calling Name information respecting a calling party to a called party, the method comprising:

receiving the TR-1188 Calling Name query including a calling party number and an identifier for the called party;

using the identifier to determine that an alternate service provider serves as a Calling Name service provider for the called party; and causing the TR-1188 Calling Name query to be routed to the alternate service provider.

2. A method for routing a Calling Name query to provide Calling Name information respecting a calling party to a called party, the method comprising:

receiving the Calling Name query from a network element serving the called party with the Calling Name query including a calling party number and an identifier for the called party.

using the identifier to directly make a determination that a local service provider serves as a Calling Name service provider for the called party; and in response to the determination, causing the Calling Name query to be routed to a database of the local service provider.

3. The method for routing a Calling Name query, as recited in claim 2, wherein making a finding that the calling party number is within a service region of the local service is a prerequisite to causing the Calling Name query to be sent to the database of the local service provider.

4. The method for routing a Calling Name query, as recited in claim 2, further comprising:

making a finding that the calling party number is not within a service region of the local service provider; and based on the finding, instead of causing the Calling Name query to be sent to the database of the local service provider, then causing the Calling Name query to be sent to an out-of-region (OOR) data file.

5. The method for routing a Calling Name query, as recited in claim 2, further comprising:

making a finding that the calling party number is not within a service region of the local service provider; and based on the finding, checking whether an out-of-region (OOR) data file is available; and if the OOR data file is unavailable, then causing the Calling Name query to be sent to the database of the local service provider.

6. The method for routing a Calling Name query, as recited in claim 2, further comprising:

making a finding that the calling party number is within a service area of a service region of the local service provider; and based on the finding, then causing the Calling Name query to be sent to the database of the local service provider.

7. The method for routing a Calling Name query, as recited in claim 2, wherein the database of the local service provider serves a service area within a service region of the local service provider; and further comprising:

making a finding that the calling party number is not within the service area of the service region of the local service provider; and in response to the finding, then causing the Calling Name query to be sent to another database of the local service provider instead of the database.

8. The method for routing a Calling Name query, as recited in claim 2, further comprising:
making a finding that the calling party number is within a service area of a service region of the local service provider; and
based on the finding, checking whether the calling party number is ported; and
if the calling party number is not ported, then causing the Calling Name query to be sent to the database of the local service provider.

9. The method for routing a Calling Name query, as recited in claim 2, further comprising:
making a finding that the calling party number is within a service area of a service region of the local service provider; and
based on the finding, checking whether the calling party number is ported; and
if the calling party number is ported, causing the Calling Name query to be sent to a service provider serving the calling party instead of causing the Calling Name query to be sent to the database of the local service provider.

10. The method for routing a Calling Name query, as recited in claim 2, further comprising:
making a finding that the calling party number is ported; and
in response to the finding, sending the query to a service provider serving the calling party instead of sending the query to the database of the local service provider.

11. A system for routing a TR-1188 Calling Name query to provide Calling Name information respecting a calling party to a called party, the system comprising:
an intelligent device for receiving the TR-1188 Calling Name query, which includes a calling party number and an identifier for the called party;
the intelligent device operative to use the identifier to determine that an alternate service provider serves as a Calling Name service provider for the called party; and
the intelligent device operative to cause the TR-1188 Calling Name query to be sent to the alternate service provider.

12. The system of claim 11, wherein the intelligent device comprises a service control point (SCP).

13. The system of claim 11, wherein the intelligent device comprises a network service.

14. A method for routing a Calling Name query, the method comprising:
receiving a Calling name query identifying a called number from a network element serving the called number;
determining a service provider that provides Calling Name service to the called number; and
routing the Calling Name query to the service provider.

15. The method of claim 14, wherein the Calling Name query includes a calling number.

16. The method of claim 15, wherein, as a prerequisite to the routing of the Calling Name query to the service provider, finding the calling number is served by the service provider.

17. The method of claim 15, wherein, prior to the routing of the Calling Name query to the service provider, finding that the calling number is not served by the service provider, and instead of routing the Calling Name query to the service provider, routing the Calling name query to an out-of-region (OOR) file.

18. The method of claim 15, wherein, prior to the routing of the Calling Name query to the service provider, finding that an out-of-region (OOR) file relating to the calling number is unavailable.

19. The method of claim 14, wherein the service provider comprises a local service provider to the called number.

20. The method of claim 15, wherein, prior to the routing of the Calling Name query to the service provider, finding the calling number is not ported.

21. The method of claim 15, wherein, prior to the routing of the Calling Name query to the service provider, finding that the calling number is served by a service provider that provides the Calling Name service to the called number, and instead of routing the Calling Name query to the service provider, sending the Calling Name query to the different service provider.

22. A system for routing a TR-1188 Calling Name query, the system comprising:
an intelligent device for receiving the TR-1188 Calling Name query identifying the called party;
the intelligent device operative to determine a service provider providing Calling Name service to the called party and
the intelligent device operative to cause the TR-1188 Calling Name query to be sent the service provider.

23. The system of claim 22, wherein the intelligent device comprises a service control point (SCP).

24. The system of claim 23, wherein the intelligent device comprises a service node.

* * * * *